United States Patent

Stoneham

[15] 3,672,285
[45] June 27, 1972

[54] SHUTTER MECHANISM

[72] Inventor: Jeffrey R. Stoneham, Hilton, N.Y.
[73] Assignee: Eastman Kodak Company, Rochester, N.Y.
[22] Filed: Dec. 21, 1970
[21] Appl. No.: 99,942

[52] U.S. Cl. ..........................................................95/59
[51] Int. Cl. .....................................................G03b 9/10
[58] Field of Search ............................95/58, 59, 62, 11.5

[56] References Cited

UNITED STATES PATENTS

| | | | |
|---|---|---|---|
| 2,986,983 | 6/1961 | Troeger | 95/59 |
| 3,033,092 | 5/1962 | Ernisse et al. | 95/59 |
| 3,205,801 | 9/1965 | Peterson | 95/11.5 |
| 3,381,598 | 5/1968 | Starp | 95/59 |
| 3,412,660 | 11/1968 | Von Wasielewski | 95/59 X |

FOREIGN PATENTS OR APPLICATIONS

| | | | |
|---|---|---|---|
| 1,112,399 | 8/1961 | Germany | 95/59 |
| 25,484 | 8/1906 | Austria | 95/59 |

*Primary Examiner*—Joseph F. Peters, Jr.
*Attorney*—W. H. J. Kline and D. Peter Hochberg

[57] ABSTRACT

A shutter mechanism including a pivotally mounted shutter blade which is rotatable between closed and open positions, a spring arm having a fixed first end and a second end which is engageable with the shutter blade for biassing the blade to the closed position, and a tab carried by the shutter blade for engaging the spring arm between the first and second ends to stop the rotation of the shutter at the open position and to return the shutter blade to the closed position.

3 Claims, 2 Drawing Figures

PATENTED JUN 27 1972    3,672,285

JEFFREY R. STONEHAM
INVENTOR.

BY D. Peter Hochberg
W. H. J. Kline

ATTORNEYS

SHUTTER MECHANISM

BACKGROUND OF THE INVENTION

1. Field of the Invention

This invention relates to camera shutter mechanisms, and in particular to the means by which the opening movement of an impact shutter is stopped, and the shutter returned from its open position to its closed position.

2. Description of the Prior Art

In order to make a photographic exposure with a camera, a camera housing is provided with an exposure aperture through which actinic light can pass to expose film in the camera. A shutter normally closes the aperture to prevent the undesired entry of light through the aperture, and the shutter is actuable to open the aperture for a predetermined period of time to admit light through the aperture. The operation of the shutter requires a precise mechanism due to the criticality of the operation.

The necessity for a carefully controlled shutter operation exists in simple, inexpensive cameras as well as in the more sophisticated cameras, and the designer of the simple camera must provide an uncomplicated but accurate shutter mechanism if the costs of manufacture are to be minimized.

A type of shutter commonly used on lower priced cameras includes a shutter blade which is mounted on a post, and is rotatable about the post in a path that includes an aperture covering or closed position, and an aperture uncovering or open position. When a plurality of blades are used, each blade need only cover a portion of the aperture. The general type of shutter is frequently of the "impact" variety, and is rotatable in response to the actuation of a drive member which strikes the blade to rotate it to the open position.

The shutter mechanism must include an accurate means for returning the blades (s) to the closed position at a predetermined time to order to control the duration of time in which light can pass through the exposure aperture. This is commonly accomplished by providing a rigid stop member in the path of the shutter blade for limiting the movement of the blade, and a return spring for rotating the blade back to the closed position. The return spring usually serves the additional function of holding the shutter blade closed during non-exposure periods. A return spring of this type is described in commonly assigned U.S. Pat. No. 3,353,467 entitled "Flash Photography", which issued on Nov. 21, 1967.

Thus, prior shutter return mechanisms of the preceding variety have required separate means for stopping the opening movement of the shutter blade, and for closing the blade. The mechanism could be simplified if these means were combined. In addition, there can be a slight jarring of the aforementioned cameras resulting from the striking of the shutter blade against a rigid stop member (which could cause blurring of the photographic image). If the opening movement of the shutter blade were stopped without a sudden impact, such jarring could not occur.

SUMMARY OF THE INVENTION

An object of the present invention is to close the shutter blade of a camera in a simple yet effective manner.

Another object is to terminate the opening motion of a pivotal camera shutter blade without jarring the camera.

A further object is to simplify the construction of a shutter mechanism.

A further object is to achieve the above objects in an economical and practical manner.

The preceding objects are accomplished according to a preferred embodiment of the invention by means of a camera shutter mechanism comprising an impact shutter blade which is pivotally mounted for rotation between an exposure aperture-closing position and an exposure aperture-opening position, and a cantilever spring arm having a fixed end and a movable end. The shutter blade is biassed towards the aperture-closing position by the movable spring end, and the blade carries means for engaging the spring arm between the two ends to stop the opening movement of the shutter blade at the open position and to return the shutter blade to the closed position.

BRIEF DESCRIPTION OF THE DRAWINGS

In the preferred embodiment of the invention described below, reference is made to the accompanying drawings, in which.

DETAILED DESCRIPTION OF THE PREFERRED EMBODIMENT

Figure 1:
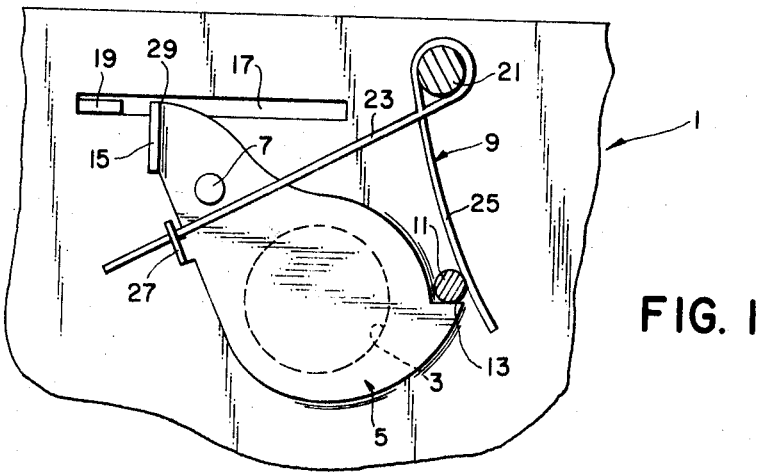
FIG. 1 is a front view of a shutter mechanism according to the invention, shown in the closed condition.

The present invention in a preferred form comprises an impact shutter blade which is mounted for rotation about a pivot. The blade is movable from a first position in which it closes a camera exposure aperture to the passage of light, to a second position in which the aperture is uncovered. The shutter's opening movement is stopped by a spring such as a wire spring, and the same spring moves the blade to its aperture covering position. Although the following discussion only describes a single shutter blade, the use of a plurality of such blades which are adapted to cover a portion of an exposure aperture and which are operated in the manner described herein, will be apparent to those skilled in the art.

Referring now to the drawings, there is illustrated a camera 1 which has an exposure aperture 3, through which actinic light can pass to make a photographic exposure when the aperture is uncovered. The various camera parts associated with the exposure making process, such as the optical system and lens diaphragm, which are not part of the present invention, have been omitted for the sake of clarity.

Figure 2:
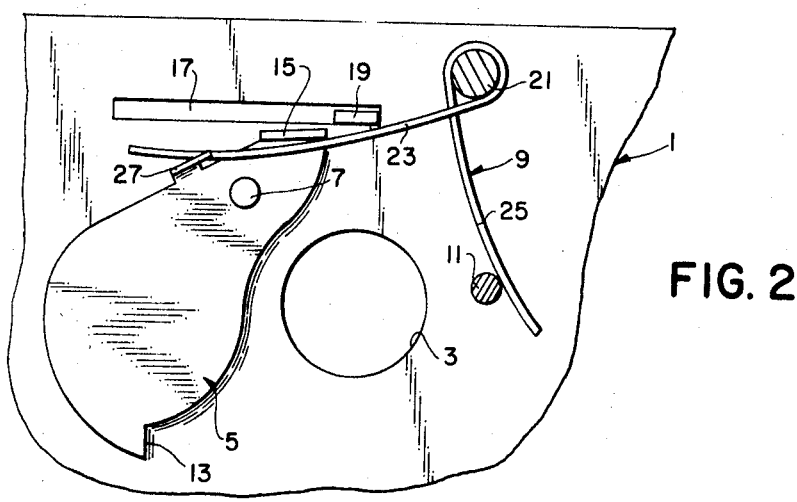
FIG. 2 shows the mechanism of FIG. 1 in the open condition.

Camera 1 further includes a shutter blade 5 which is mounted for rotation on a pivot or post 7. The blade 5 is dimensioned and mounted such that it is movable from a first or closed position in which it covers aperture 3 to block the passage of light therethrough (as shown in FIG. 1), to a second or open position in which it uncovers aperture 3 so that light can enter the aperture (as shown in FIG. 2). Shutter blade 5 is biassed towards the closed position by a spring 9, which urges blade 5 in a counterclockwise direction against a rigid stop or post 11. Shutter blade 5 is provided with an abutment surface 13 for engaging stop 11 when the shutter is in the closed position.

Shutter 5 further includes a tab 15 which is located across a slot 17 when the shutter is in the closed position. Slot 17 defines the path of a drive member 19 which is adapted to move across the slot and strike tab 15 in response to actuation the camera release member (not shown). The driving force of member 19 must be strong enough to overcome the force of spring arm 23 (which is described in detail below), and to rotate the shutter to the open position shown in FIG. 2. Driver 19 is returned to its initial position after opening the shutter, by appropriate means which are not part of the invention.

Spring 9 is adapted to control the opening movement of shutter blade 5 and to return the blade from the open position to the closed position shown in FIG. 1. The spring is a wire spring which is entwined about a post 21, and comprises legs 23 and 25. The strength of such a spring increases as the diameter of the wire increases, and decreases as the number of coils increases. Leg 23 extends from post 21 and is positioned behind 27 while leg 25 is positioned behind stop 11. Since post 21 is spaced relatively far from tab 27 (further, for instance, than from pivot 7), spring 9 can be fabricated from a sturdy wire while not necessitating an undue driving force from member 19 to open the shutter (if the length of arm 23 were shorter, an equivilently sturdy spring would be more difficult to deflect).

During the rotation of shutter blade 5 to the open position, spring arm 23 remains engaged behind tab 27 alone. However, when the shutter attains the position shown in FIG. 2, it is engaged by the corner 29 of tab 15. The latter engagement substantially stops further deflection of spring arm 23 by shutter blade 5, and the spring forces the shutter back to the closed position. In other words, when corner 29 engages arm 23, the arm acts as a rigid member which stops the further clockwise rotation of blade 5, and thereafter drives the shutter to its first position.

Other features of the invention are worthy of mention. For one, a two-speed shutter can be achieved by temporarily disabling corner 29 to increase the exposure time. For another, it is feasible to increase the closing force exerted by spring arm 23 on the shutter without increasing the driver force required to open the shutter. The preceding feature is accomplished by increasing the diameter of the spring and by proportionately increasing the length of the spring to compensate for the increased wire diameter.

A shutter mechanism of the foregoing type can comprise but two elements (excluding the drive member) — a spring and a shutter blade, and even these elements could be formed from a single piece. The opening movement of the shutter is stopped without the jarring of the camera, and operation is simple yet effective.

The invention has been described in detail with particular reference to a preferred embodiment thereof, but it will be understood that variations and modifications can be effected within the spirit and scope of the invention.

I claim:

1. A shutter mechanism for uncovering an exposure aperture to make a photographic exposure, said mechanism comprising:

a pivot;

a shutter blade rotatable about said pivot between a first position in which said blade covers at least a portion of the exposure aperture, and a second position in which said blade uncovers said portion of the exposure aperture;

means for driving said shutter blade from the first position to the second position; and spring means for stopping movement of said shutter blade at the second position, and for returning said shutter blade from the second position to the first position, said spring means comprising a spring arm having first and second ends, the second end being movable relative to the first end;

wherein:

said shutter blade has a first surface engageable by the second end of said spring arm for biasing said blade to the first position, and a second surface engageable by said spring arm at a position between the first and second ends; and said spring arm is positioned to engage said second surface when said shutter blade is driven to the second position to stop the rotation of said shutter blade from the first position.

2. In a shutter mechanism including a shutter blade movable between a closed and an open position, spring means for biasing said shutter blade to the closed position and means for driving said shutter blade towards said open position, the improvement wherein said shutter blade has a first surface engaged by said spring means to bias said shutter blade to the closed position and a second surface engageable by said spring means when said shutter blade reaches said open position to stop movement of said shutter blade.

3. A shutter mechanism as in claim 2, wherein said spring means comprises an elongated spring arm having first and second ends, said first end being fixed in a predetermined position and said second end engaging said first surface to bias said shutter blade to said closed position, said spring arm being positioned to engage said second surface to stop movement of said shutter blade when said shutter blade reaches said open position.

* * * * *